(12) United States Patent
Manowitz

(10) Patent No.: US 6,392,757 B2
(45) Date of Patent: May 21, 2002

(54) METHOD AND APPARATUS FOR IMPROVED DIGITAL IMAGE CONTROL

(75) Inventor: Neal Manowitz, Woodcliff, NJ (US)

(73) Assignee: Sony Corporation, Park Ridge, NJ (US)

( * ) Notice: Subject to any disclaimer, the term of this patent is extended or adjusted under 35 U.S.C. 154(b) by 0 days.

(21) Appl. No.: 09/258,290

(22) Filed: Feb. 26, 1999

(51) Int. Cl.[7] .......................... H04N 5/225; H04N 1/40; G06F 15/00

(52) U.S. Cl. ................... 358/1.15; 358/444; 358/909.1; 710/13

(58) Field of Search ................................ 358/442, 404, 358/444, 468, 400, 1.15, 909.1; 709/200, 213; 710/13; 348/233

(56) References Cited

U.S. PATENT DOCUMENTS

| | | | |
|---|---|---|---|
| 5,189,287 A | * 2/1993 | Parienti | 235/375 |
| 5,416,711 A | * 5/1995 | Gran et al. | 364/436 |
| 5,671,368 A | * 9/1997 | Chan et al. | 395/282 |
| 5,694,615 A | * 12/1997 | Thapar et al. | 395/822 |
| 5,774,752 A | * 6/1998 | Patton et al. | 396/312 |
| 5,809,520 A | * 9/1998 | Edwards et al. | 710/13 |
| 5,870,155 A | * 2/1999 | Erlin | 348/734 |
| 5,890,016 A | * 3/1999 | Tso | 395/884 |
| 5,894,425 A | * 4/1999 | Saliba | 364/708.1 |
| 5,973,756 A | * 10/1999 | Erlin | 348/734 |
| 6,003,092 A | * 12/1999 | Waters | 709/248 |

OTHER PUBLICATIONS

"Smile! You're on MPEG camera!" by Buzz Webster (2 pages).
"Technical Summary of 'IrDA DATA' and 'IrDA CONTROL'," http://www.irda.org/standards/standards.asp (4 pages).
Unisys Aquanta Products Library, "IEEE—1394 High Performance Serial Bus," http://www.pc.unisys.com/tech_papers/k4.html (13 pages).
Adaptec, "Fire on the Wire: The IEEE 1394 High Performance Serial Bus," http://www.adaptec.com/technology/standards/1394bus.html (7 pages).

* cited by examiner

Primary Examiner—Kimberly A. Williams
(74) Attorney, Agent, or Firm—Finnegan, Henderson, Farabow, Garrett & Dunner, LLP

(57) ABSTRACT

Systems and methods consistent with the present invention use a remote-control device to retrieve digital images from portable digital memory and transmit the digital image to a computer, a network, or another remote-control device. A user inserts the portable digital memory into a the remote-control device and browses the digital images stored in the portable digital memory. Upon the user's instructions, the remote-control device transmits the digital image, preferably using an infrared transmitter. The user can also receive digital images from a computer, a network, or another remote-control device. A user inserts the portable digital memory into the remote-control device and the remote-control device receives a digital image, preferably using an infrared receiver. Upon the user's instructions, the remote-control device stores the digital image into the portable digital memory.

18 Claims, 4 Drawing Sheets

METHOD AND APPARATUS FOR IMPROVED DIGITAL IMAGE CONTROL

TECHNICAL FIELD

The present invention is directed generally to controlling digital images, and in particular, to a portable remote-control device for displaying, transmitting, and receiving digital images.

BACKGROUND OF THE ART

Digital cameras store images in digital memory, typically a portable digital memory such as a Memory Stick™, a "digital film," or a "flash memory card." Digital cameras, however, often have limited image viewing capabilities. Therefore, a user must often remove the portable digital memory from the camera and transfer it to a computer to view images. This limits the practicality of such devices because computers are typically expensive and are often bulky.

Some digital cameras include an infrared transmitter to transfer images to the computer for storing or viewing. This connection is typically limited and impractical because using the infrared transmitter typically requires the user to place the camera within a few feet of the receiving computer.

Therefore, it is desirable to have an image viewing device that is portable like a digital camera, but with the viewing capabilities of a computer. It is also desirable to be able to transmit digital images without the limited transmission range of current digital cameras.

DISCLOSURE OF THE INVENTION

The advantages and purposes of the invention are set forth in part in the description that follows, and in part are obvious from the description, or may be learned by practice of the invention. The advantages and purposes of the invention are realized and attained by means of the elements and combinations particularly pointed out in the claims.

A method consistent with this invention for retrieving and transmitting a digital image on a portable remote-control device including a transmitter, comprises the stages of detecting a connection of a portable digital memory to the remote-control device, retrieving a digital signal representing the image from the portable digital memory, and transmitting the digital signal using the transmitter. The method may further include displaying the image on a display in the remote-control device.

A method consistent with this invention for receiving and storing a digital image on a portable remote-control device including a receiver, comprises the stages of detecting a connection of a portable digital memory to the remote-control device, receiving a digital signal representing the image using the receiver, and storing the digital signal into the portable digital memory. The method may also include displaying the image on a display in the remote-control device.

An apparatus consistent with this invention comprises a portable remote-control device including means for detecting a connection of a portable digital memory to the remote-control device, means for retrieving a digital signal representing a digital image from the portable digital memory, and means for transmitting the digital signal. The apparatus may also include means for displaying the image on a display in the remote-control device.

An apparatus consistent with this invention comprises a portable remote-control device including means for detecting a connection of a portable digital memory to the remote-control device, means for receiving a digital signal representing a digital image, and means for storing the digital signal into the portable digital memory. The apparatus may include means for displaying the image on a display in the remote-control device.

The summary and the following detailed description should not restrict the scope of the claimed invention. Both provide examples and explanations to enable others to practice the invention. The accompanying drawings, which form part of the detailed description, show one embodiment of the invention, and together with the description, explain the principles of the invention.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

BEST MODE FOR CARRYING OUT THE INVENTION

Reference is made in detail to the exemplary embodiments of the invention, examples of which are illustrated in the accompanying drawings. Wherever possible, the same reference numbers are used throughout the drawings to refer to the same or like parts.

Overview

Systems and method s consistent with this invention allow the use of a remote-control device to retrieve images from portable digital memory, display them, and transmit them to a computer, a network, or another remote-control device. A user can insert the portable digital memory into the remote-control device, causing the device to display an image stored in the portable digital memory. The device prompts the user and the user can browse the images stored in the portable digital memory. The user can then transmit the image using a transmitter, preferably an infrared transmitter, to a computer, a network, or another remote-control device. Preferably, the user can transmit the image from the remote-control device to the receiver from across a large room.

Systems and methods consistent with this invention also allow the use of a remote-control device to receive images from a computer, a network, or another remote-control device, then display them, and store them into the portable digital memory. The user inserts the portable digital memory into the remote-control device. The device receives an image via the receiver, preferably an infrared receiver, and displays the image. The device prompts the user to determine whether the user wants to store the image. If the user does, the device stores the image into the portable digital memory.

Hardware

Figure 1:
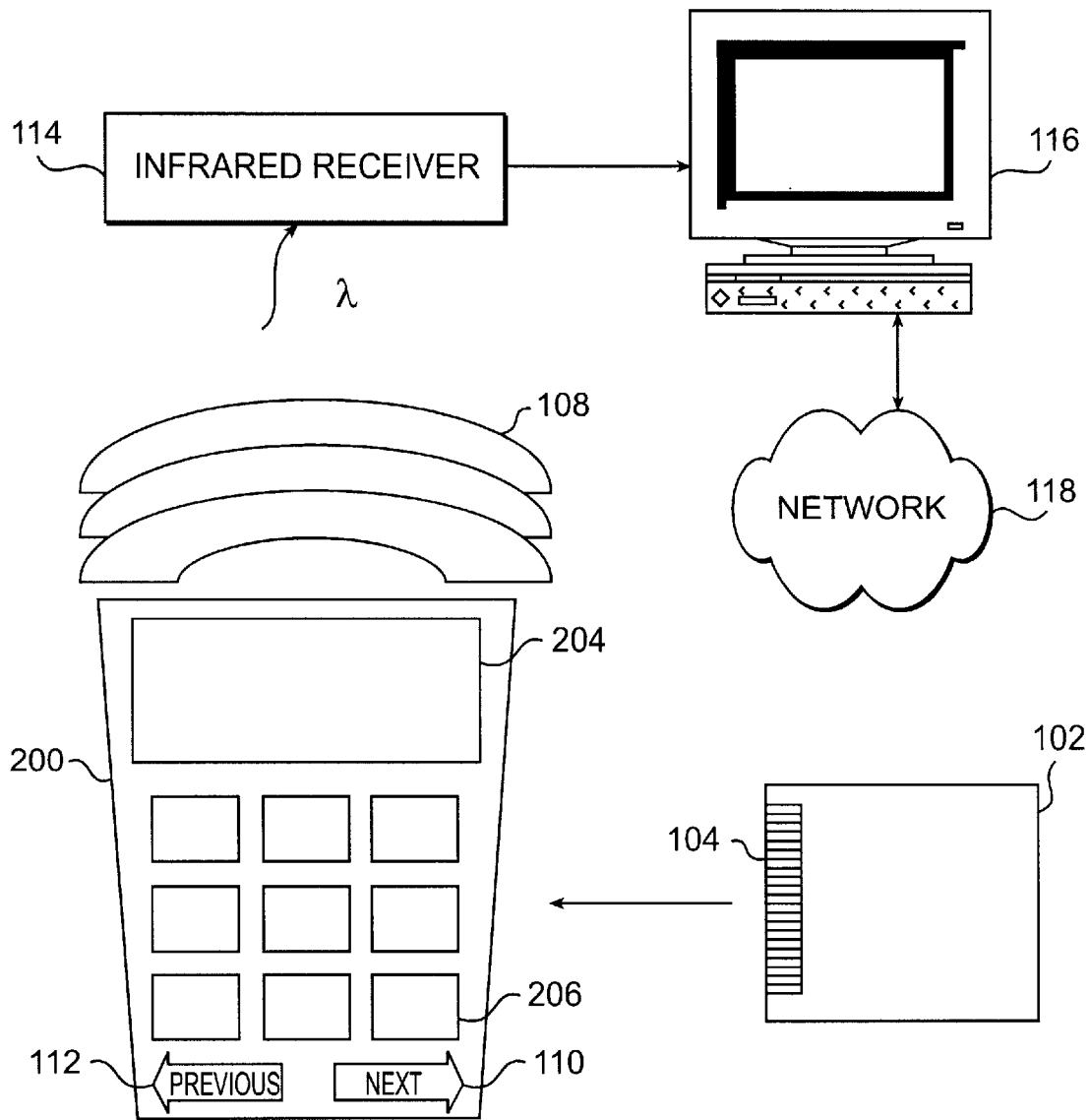
FIG. 1 is a block diagram of a digital image control system consistent with this invention.

FIG. 1 is a diagram of a digital image control system consistent with this invention. The system contains portable digital memory 102, which in one embodiment comprises a digital film. One suitable digital film that can be used is a Memory Stick™ available from Sony. Conductive contacts 104 on the portable digital memory 102 enable it to communicate with external equipment, such as remote-control device 200.

Remote-control device 200 includes a keypad 206 with a "previous" key 112 and a "next" key 110. Remote control device 200 may transmit infrared radiation 108 to an infrared receiver 114, which is external to remote control device 200. The infrared radiation 108 transmitted by device 200 is strong enough so that infrared receiver 114 can receive information from remote-control device 200 from across a large room. For example, device 200 should be able to transmit to a receiver 114 that is 2–5 meters away. In one embodiment, remote control device 200 and receiver 114 may use IrDA DATA, an infrared communications protocol well known in the art, to communicate with each other Infrared receiver 114 may be connected to a computer 116, and in turn computer 116 may be connected to a network 118. Network 118 may comprise a wired network such as the Internet or an intranet, or any equivalent network such as a wide area network, a local area network, or a public or private wireless network. Computer 116 may be any type of computer, including a personal computer, laptop computer, workstation, etc. Receiver 114 may correspond to an infrared receiver in another remote-control device similar to the remote-control device 200 displayed in FIG. 1.

Figure 2:
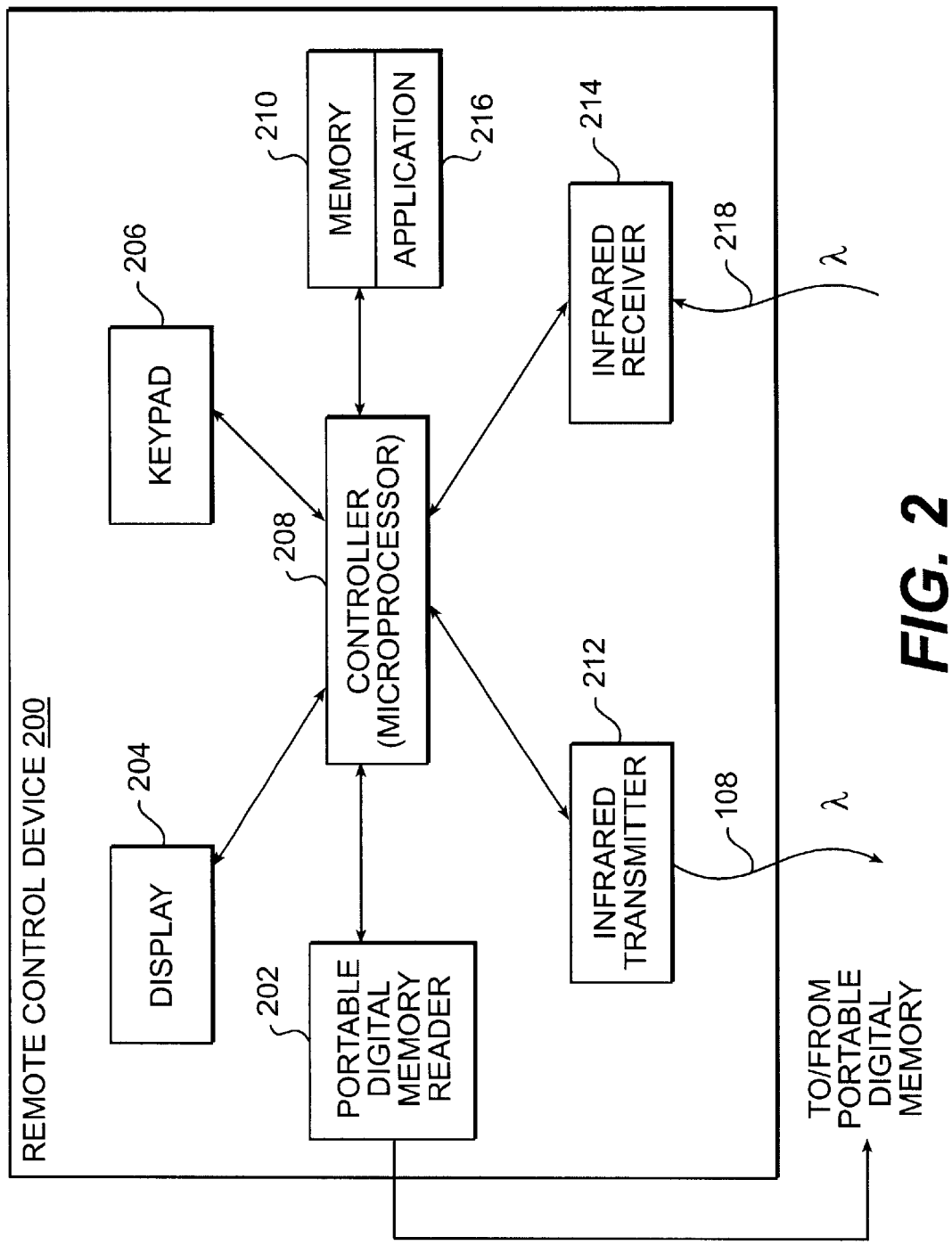
FIG. 2 is a block diagram of components of a remote-control device consistent with this invention.

FIG. 2 is a block diagram of components of a remote-control device 200 consistent with this invention. Remote-control device 200 contains a display 204, a keypad 206, a controller (or microprocessor) 208, a memory 210, a portable digital memory reader 202, and an infrared transmitter 212 and receiver 214. The portable digital memory 102 connects to remote-control device 200 through portable digital memory reader 202. Keypad 206 contains control keys for operation of the remote-control device 200, e.g., the "previous" key 112 and "next" key 110 (shown in FIG. 1). Memory 210 contains a remote-control device application program 216, which executes in controller 208 and controls the various functions of the remote-control device 200, including those consistent with this invention. All components 202, 204, 206, 210, and 214 connect to controller 208, which controls the components to implement the functionality of the invention.

In another embodiment, the portable digital memory comprises a smart card. A smart card is the size of a credit card and has a built-in integrated circuit (IC) microcontroller. The smart card also contains electrically erasable programmable read only memory (EEPROM) that could store digital images. One suitable microcontroller-based single-wafer IC that can be used in a smart card is available from Motorola Corporation (model no. MSC1014). Conductive contacts on the microcontroller enable the smart card to communicate with external equipment. Preferably, smart card 102 is constructed in accordance with international standard ISO 7816.

Procedure

Figure 3:
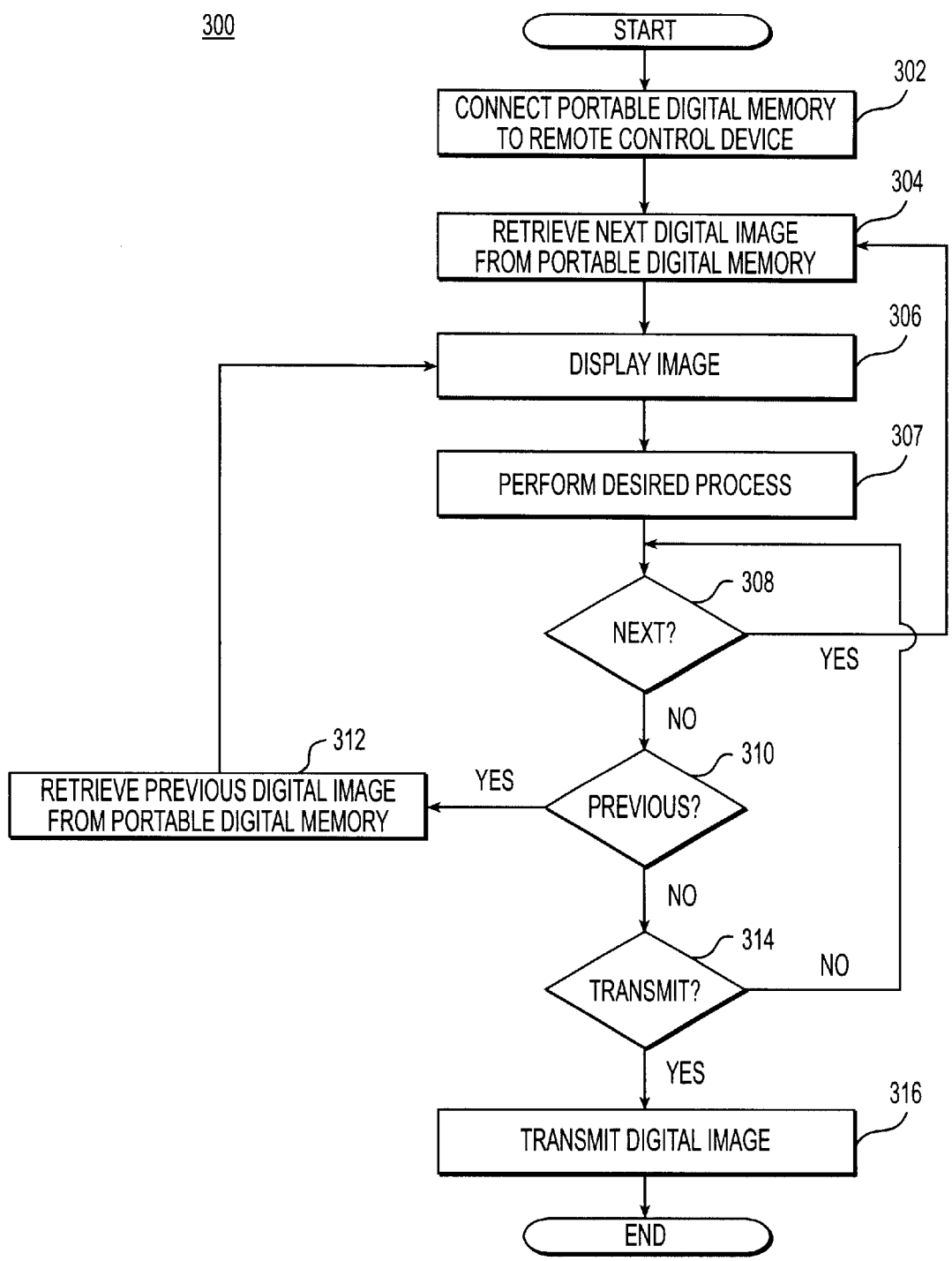
FIG. 3 is a flowchart of a process consistent with this invention for retrieving and transmitting an image with a remote-control device.

FIG. 3 is a flowchart of a process consistent with this invention for retrieving and transmitting an image using remote-control device 200. Initially, a user connects portable digital memory 102 to remote-control device 200 (stage 302) by inserting portable digital memory 102 into portable digital memory reader 202. Controller 208 then retrieves the next digital signal representing a digital image stored in portable digital memory (stage 304). The first time stage 304 is executed, the next image is the first image. Controller 208 may display the image on display 204 (stage 306). If the user wishes, the user may perform a desired process on the image (stage 307), such as editing, modifying, or renaming. The user may browse the images stored in portable digital memory 102. For instance, the user may press the "next" key 110 (stage 308) to view the next image (stage 304). The user also could press the "previous" key 112 (stage 310) to view the previous image. The process continues to wait for the user to press "next" key 110, or "previous" key 112 (stages 308 and 310).

If the user instructs controller 208 via keypad 206 to transmit the image (stage 314), controller 208 transmits the image currently displayed via infrared transmitter 220 (stage 316). After transmission of the image, process 300 ends, but may be restarted if the user desires.

In an embodiment where the portable digital memory 102 includes a smart card, controller 208 retrieves the stored digital image from the smart card. Controller 208 does this by sending one or multiple READ BINARY commands to the smart card microcontroller. The READ BINARY command is outlined in international standard ISO 7816. According to this standard, controller 208 performs communication between controller 208 and the smart card through Application Protocol Data Unit (APDU) commands, including WRITE BINARY and READ BINARY. Controller 208 may also use commands other than READ BINARY, such as a higher-order commands in an application program interface.

Figure 4:
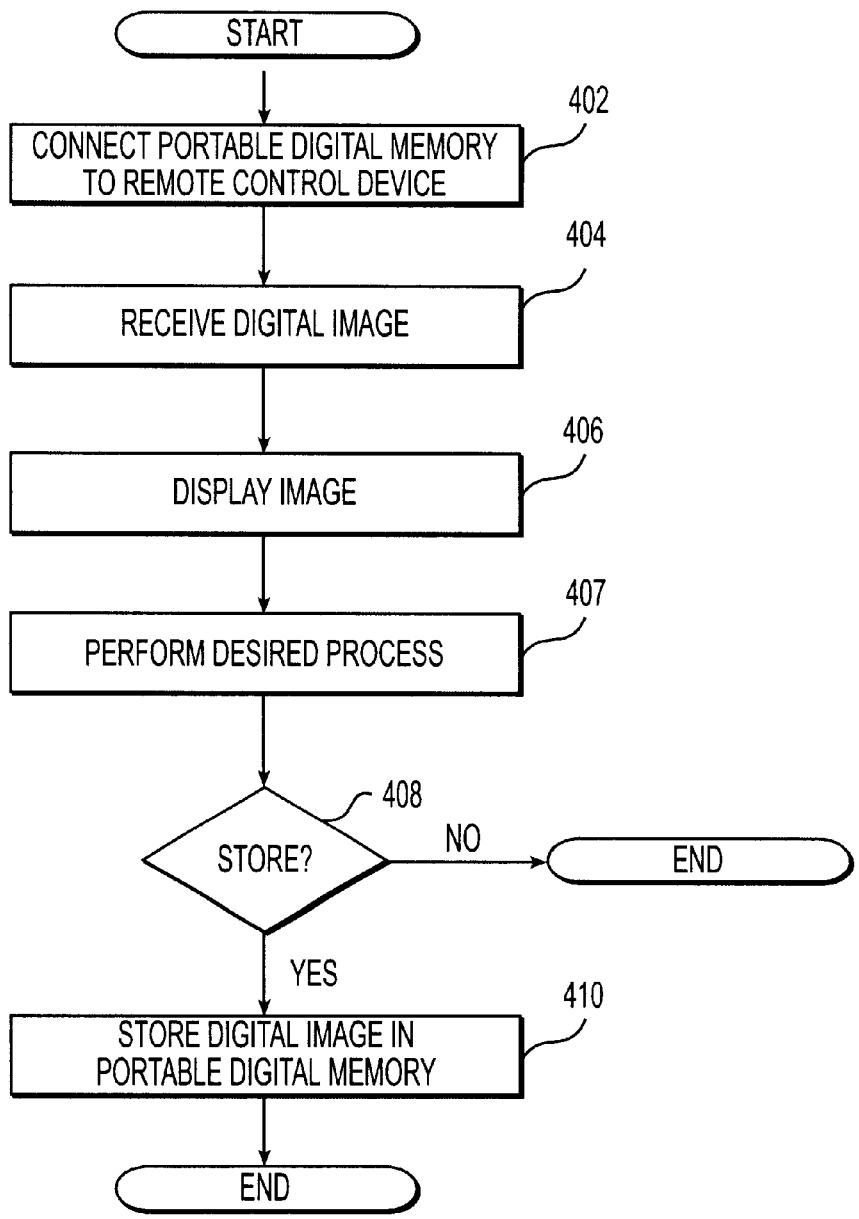
FIG. 4 is a flowchart of a process consistent with this invention for receiving and storing an image using a remote-control device.

FIG. 4 is a flowchart of a process 400 consistent with this invention for receiving and storing an image using remote-control device 200. To begin, a user connects portable digital memory 102 to remote-control device 200 (stage 402) by inserting portable digital memory 102 into portable digital memory reader 202.

Controller 208 receives a digital image signal, preferably via infrared receiver 214, and displays it on display 204 (stage 406). If the user wishes, the user may perform a desired process on the image (step 407), such as editing, modifying, or renaming. At this point, the user may view it and decide whether to store it into portable digital memory 102 or not (stage 408). If the user decides to store the image, the system does so (stage 410). Process 400 ends, but may restart if the user desires.

In an embodiment where the portable digital memory 102 includes a smart card, controller 308 may store the image signal by sending one or multiple WRITE BINARY commands to the smart card. The WRITE BINARY command is outlined in international standard ISO 7816. Controller 208 may also use commands other than WRITE BINARY, such as higher-order commands in an application program interface. The smart card stores the digital image as allowed by ISO 7816.

Remote-control device application program 316 executes in controller 208 and controls the retrieve and transmit process 300 and the receive and store process 400. It also may prompt the user so that the user may instruct remote-control device 200 to store an image (stage 408), display the next image (stage 308), display the previous image (stage 310), or transmit an image (stage 314).

It is apparent to those skilled in the art that various modifications and variations can be made to the construction of remote-control device 200 without departing from the scope or spirit of the invention. For example, remote-control device 102 could be configured to receive and transmit information via radio communication or a physical connection.

It also apparent to those skilled in the art that various modifications and variations can be made in user interface of device 200 of this invention without departing from the scope or spirit of the invention. For instance, the user could access a menu structure to execute commands. Further, device 200 could include a touch screen instead of a keypad. Or, device 200 could include thumb dial, also known as a Jog Dial™. In one embodiment, the thumb dial could replace or supplement the next and previous keys. Also, performing the desired processes (stages 307 and 407) may include printing an image on a printer attached to device 200.

It is apparent to those skilled in the art that various modifications and variations can be made to the construction of computer 116 without departing from the scope or spirit of the invention. For example, computer 116 could be a television, a printer, or any consumer electronic device.

The description of the invention is not meant to limit the invention. Instead it provides examples and explanations to allow persons of ordinary skill to appreciate different ways to practice the invention. The following claims define the true scope and spirit of the invention.

What is claimed is:

1. An apparatus comprising:
    a portable remote-control device including
        means for detecting a connection of a portable digital memory to the remote-control device;
        means for receiving a digital signal representing a plurality of digital images;
        means for displaying one of the plurality of digital images;
        a user-input device configured for a user to display a next image of the plurality of digital images and to select a selected image among the plurality of digital images; and
        means for storing a digital signal representing the selected image into the portable digital memory.

2. The apparatus of claim 1, wherein the portable digital memory includes a Memory Stick, and wherein the portable digital memory reader includes a Memory Stick reader.

3. The apparatus of claim 1, wherein the portable digital memory includes a digital film, and wherein the portable digital memory reader includes a digital film reader.

4. The apparatus of claim 1, wherein the portable digital memory includes a smart card, and wherein the portable digital memory reader includes a smart card reader.

5. The apparatus of claim 1, wherein the receiving means includes means for receiving the digital signal representing the plurality of digital images using an infrared receiver.

6. The apparatus of claim 1, wherein the receiving means includes means for receiving the digital signal representing the plurality of digital images through a network connected to the remote-control device.

7. The apparatus of claim 1, including means for transmitting the received digital signal to a computer.

8. The apparatus of claim 1, including means for transmitting the received digital signal to a computer in a network.

9. The apparatus of claim 1, wherein the means of receiving includes means for receiving the digital signal from farther than 2 meters from the source.

10. A method for receiving and storing digital images using a portable remote-control device including a receiver, said method comprising:
    detecting a connection of a portable digital memory to the remote-control device;
    receiving a digital signal representing a plurality of images using the receiver;
    displaying one of the plurality of digital images;
    providing a user-input device configured for a user to display a next image of the plurality of digital images and to select a selected image among the plurality of digital images; and
    storing a digital signal representing the selected image into the portable digital memory.

11. The method of claim 10, including the stage of transmitting the received digital signal to a computer.

12. The method of claim 10, including the stage of transmitting the received digital signal to a computer in a network.

13. The method of claim 10, wherein the stage of receiving includes the stage of receiving the digital signal from farther than 2 meters from the source.

14. The method of claim 10, wherein the portable digital memory includes a Memory Stick, and wherein the detecting stage includes the stage of detecting a connection of the Memory Stick into a Memory Stick reader.

15. The method of claim 10, wherein the portable digital memory includes a digital film, and wherein the detecting stage includes the stage of detecting a connection of the digital film into a digital film reader.

16. The method of claim 10, wherein the portable digital memory includes a smart card, and wherein the detecting the connection stage includes the stage of detecting an insertion of the smart card into a smart card reader.

17. The method of claim 10, wherein the receiving stage includes the stage of receiving the digital signal representing the plurality of images using an infrared receiver.

18. The method of claim 10, wherein the receiving stage includes the stage of receiving the digital signal representing the plurality of images through a network connected to the remote-control device.

* * * * *